United States Patent
Guo et al.

(10) Patent No.: US 10,796,087 B2
(45) Date of Patent: Oct. 6, 2020

(54) METHOD AND APPARATUS FOR OBTAINING WEB CONTENT

(71) Applicant: Huawei Technologies Co., Ltd., Shenzhen (CN)

(72) Inventors: Nairong Guo, Nanjing (CN); Yongde Li, Nanjing (CN); Qiqiang Zhong, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/312,111

(22) PCT Filed: Jun. 22, 2016

(86) PCT No.: PCT/CN2016/086787
§ 371 (c)(1),
(2) Date: Dec. 20, 2018

(87) PCT Pub. No.: WO2017/219293
PCT Pub. Date: Dec. 28, 2017

(65) Prior Publication Data
US 2019/0205367 A1  Jul. 4, 2019

(51) Int. Cl.
*G06F 40/197* (2020.01)
*G06F 16/957* (2019.01)
(Continued)

(52) U.S. Cl.
CPC .......... *G06F 40/197* (2020.01); *G06F 16/957* (2019.01); *G06F 16/9535* (2019.01); *G06F 40/14* (2020.01)

(58) Field of Classification Search
CPC .................................................... G06F 40/197
(Continued)

(56) References Cited

U.S. PATENT DOCUMENTS 8,365,082 B2 * 1/2013 Skirpa ................. G06F 17/2247
715/760
9,418,388 B1 * 8/2016 Young ................... G06F 16/958
(Continued)

FOREIGN PATENT DOCUMENTS

CN  104216698 A  12/2014
CN  104363569 A   2/2015
(Continued)

OTHER PUBLICATIONS

Machine Translation and Abstract of Chinese Publication No. CN104216698, Dec. 17, 2014, 33 pages.
(Continued)

*Primary Examiner* — William D Titcomb
(74) *Attorney, Agent, or Firm* — Conley Rose, P.C.

(57) ABSTRACT

A method and an apparatus relate to the field of terminal technologies and for obtaining web content, where the method includes determining a web view control corresponding to web content displayed on a first display interface, where the first display interface is an interface displayed on a display screen of an intelligent terminal when an application runs on the intelligent terminal, registering a web content loading complete function with an operating system of the intelligent terminal, determining that the operating system invokes the web content loading complete function, where the operating system invokes the web content loading complete function after determining that the web content displayed by the web view control is loaded completely, obtaining the web content after the operating system invokes the web content loading complete function, and sending the obtained web content to the operating system.

20 Claims, 9 Drawing Sheets

(a)

(b)

(51) Int. Cl.
*G06F 40/14* (2020.01)
*G06F 16/9535* (2019.01)

(58) Field of Classification Search
USPC ........................................................ 715/745
See application file for complete search history.

(56) References Cited

U.S. PATENT DOCUMENTS

| | | | | |
|---|---|---|---|---|
| 9,971,752 | B2* | 5/2018 | Vagell | G06F 17/24 |
| 2010/0174774 | A1* | 7/2010 | Kern | G06F 16/95 |
| | | | | 709/203 |
| 2011/0154185 | A1* | 6/2011 | Kern | G06F 16/95 |
| | | | | 715/234 |
| 2012/0010995 | A1* | 1/2012 | Skirpa | G06F 3/0481 |
| | | | | 705/14.49 |
| 2012/0224214 | A1 | 9/2012 | Ito | |
| 2016/0162454 | A1* | 6/2016 | Bargagni | G06F 16/748 |
| | | | | 715/745 |

FOREIGN PATENT DOCUMENTS

| | | |
|---|---|---|
| CN | 104822156 A | 8/2015 |
| CN | 104951375 A | 9/2015 |
| CN | 105095207 A | 11/2015 |
| CN | 105677730 A | 6/2016 |
| WO | 2013025193 A1 | 2/2013 |

OTHER PUBLICATIONS

Machine Translation and Abstract of Chinese Publication No. CN104363569, Feb. 18, 2015, 14 pages.
Machine Translation and Abstract of Chinese Publication No. CN104822156, Aug. 5, 2015, 16 pages.
Machine Translation and Abstract of Chinese Publication No. CN104951375, Sep. 30, 2015, 12 pages.
Machine Translation and Abstract of Chinese Publication No. CN105095207, Nov. 25, 2015, 19 pages.
Machine Translation and Abstract of Chinese Publication No. CN105677730, Jun. 15, 2016, 21 pages.
Hap_gx "Obtaining Webview Loading Contents Through Java in Android," From the internet: https://blog.csdn.net/hap_gx/article/details/9473335, Jul. 25, 2015, 2 pages.
English Translation of Hap gx "Obtaining Webview Loading Contents Through Java in Android," From the internet: https://blog.csdn.net/hap_gx/article/details/9473335, Jul. 25, 2015, 2 pages.
Foreign Communication From a Counterpart Application, PCT Application No. PCT/CN2016/086787, English Translation of International Search Report dated Mar. 1, 2017, 2 pages.
Foreign Communication From a Counterpart Application, PCT Application No. PCT/CN2016/086787, English Translation of Written Opinion dated Mar. 1, 2017, 4 pages.
Foreign Communication From a Counterpart Application, European Application No. 16905835.1, Extended European Search Report dated Feb. 25, 2019, 8 pages.

* cited by examiner

METHOD AND APPARATUS FOR OBTAINING WEB CONTENT

CROSS-REFERENCE TO RELATED APPLICATIONS

This application is a U.S. National Stage of International Patent Application No. PCT/CN2016/086787 filed on Jun. 22, 2016, which is hereby incorporated by reference in its entirety.

TECHNICAL FIELD

The present invention relates to the field of terminal technologies, and in particular, to a method and an apparatus for obtaining web (web) content.

BACKGROUND

With continuous development of intelligent terminals, users have higher requirements on the intelligent terminals. For example, a user requires that an intelligent terminal should recommend useful content or the like to the user. To recommend useful content to the user, first, the intelligent terminal needs to obtain some necessary content. For example, the intelligent terminal needs to obtain web content displayed on a display interface when an application (application, APP) installed on the intelligent terminal accesses a website, or the like.

In a common manner, the intelligent terminal obtains, by analyzing a log and a domain name system (domain name system, DNS) record that are generated when the application installed on the intelligent terminal runs, the web content displayed on the display interface when the application accesses the website. Generally, when the application runs, the application generates logs, for example, logs about accessing the website, exiting the website, click actions on the website, or interactions between modules. An operating system of the intelligent terminal also generates logs when running, for example, logs about creation and destruction of the application, and a network status change. When the application accesses the website, the operating system of the intelligent terminal further stores a mapping relationship between a domain name of the website accessed by the application and an Internet Protocol (Internet protocol, IP) address of the intelligent terminal, namely, a DNS record.

However, content of the foregoing logs usually does not include content of the website, or even some applications do not generate logs. DNS records can only reflect websites that are accessed by the application but cannot reflect web content displayed on the display interface when the application accesses the websites. Therefore, in the foregoing manner, the intelligent terminal cannot obtain the web content displayed on the display interface when the application runs.

SUMMARY

This application provides a method and an apparatus for obtaining web content, so that an intelligent terminal can obtain web content displayed on a display interface when an application runs.

To achieve the foregoing objective, the following technical solutions are used in this application:

According to a first aspect, a method for obtaining web content is provided, and the method includes: determining a web view control corresponding to web content displayed on a first display interface that is displayed on a display screen of an intelligent terminal when an application runs on the intelligent terminal; registering a web content loading complete function with an operating system of the intelligent terminal; determining that the operating system invokes the web content loading complete function, where the operating system invokes the web content loading complete function after determining that the web content displayed by the web view control is loaded completely; obtaining the web content after determining that the operating system invokes the web content loading complete function; and sending the obtained web content to the operating system.

For ease of description, in this application, the interface displayed on the display screen of the intelligent terminal may be referred to as a display interface of the intelligent terminal. For example, an interface currently displayed on the display screen of the intelligent terminal may be referred to as a current display interface of the intelligent terminal; and the first display interface displayed on the display screen of the intelligent terminal when the application runs may be referred to as the first display interface of the intelligent terminal.

In this application, after the web view control corresponding to the web content displayed on the first display interface that is displayed on the display screen of the intelligent terminal when the application runs is determined, the web content loading complete function is registered with the operating system of the intelligent terminal. This may ensure that, after all web content displayed by the web view control is loaded completely, the operating system may invoke the web content loading complete function to respond to the event that the web content is loaded completely. That is, if it is determined that the operating system invokes the web content loading complete function, it may be determined that the web content is loaded completely. Therefore, it may be ensured that the web content starts to be obtained only after all the web content is loaded completely, and the obtained web content is sent to the operating system. Therefore, the operating system may obtain the web content displayed on the display interface of the intelligent terminal when the application runs, and the intelligent terminal can obtain the web content displayed on the display interface when the application runs.

In this application, the web content displayed on the display interface of the intelligent terminal is the web content displayed by the web view control on the display interface. In addition, the web view control corresponding to the web content displayed on the first display interface of the intelligent terminal is a web view control visible to a user on the first display interface.

In a first optional implementation of the first aspect, the method of determining a web view control corresponding to web content displayed on a first display interface includes: determining that the operating system of the intelligent terminal invokes a redraw notification interface, where the operating system invokes the redraw notification interface when an interface currently displayed on the display screen of the intelligent terminal (namely, the current display interface of the intelligent terminal) changes; and after determining that the operating system invokes the redraw notification interface, traversing controls corresponding to content displayed on the first display interface after the change, so as to determine the web view control corresponding to the web content displayed on the first display interface.

In this application, during running of the application, when the interface currently displayed on the display screen of the intelligent terminal (namely, the current display interface of the intelligent terminal) changes, for example, when the current display interface of the intelligent terminal is updated to the first display interface, the operating system of the intelligent terminal invokes the redraw notification interface. Because the redraw notification interface (specifically, code for implementing the redraw notification interface) is stored in an obtaining apparatus for performing the method for obtaining web content according to this embodiment of the present invention, when the operating system invokes the redraw notification interface, the obtaining apparatus may learn that the operating system invokes the redraw notification interface. Therefore, the obtaining apparatus may learn that the current display interface of the intelligent terminal changes. Further, the obtaining apparatus may traverse the controls corresponding to the content displayed on the first display interface after the change, so as to determine, from the controls, the web view control corresponding to the web content displayed on the first display interface.

In this application, after it is determined that the operating system of the intelligent terminal invokes the redraw notification interface, the event that the operating system invokes the redraw notification interface may be converted into a traversal event, and then the traversal event is performed, that is, traversing the controls corresponding to the content displayed on the first display interface, to determine the web view control corresponding to the web content displayed on the first display interface. Therefore, a response speed of the first display interface may be increased when the first display interface is traversed.

Because the obtaining apparatus may accurately determine the web view control corresponding to the web content displayed on the display interface (namely, the first display interface) of the intelligent terminal when the application runs, the obtaining apparatus can accurately obtain the web content displayed by the web view control.

In a second optional implementation of the first aspect, the method of registering a web content loading complete function with an operating system of the intelligent terminal, and determining that the operating system invokes the web content loading complete function includes: registering the web content loading complete function with the operating system by using a web registration and callback interface of the operating system; and determining, by using the web registration and callback interface of the operating system, that the operating system invokes the web content loading complete function.

The registering a web content loading complete function with an operating system of the intelligent terminal, and determining that the operating system invokes the web content loading complete function may be referred to as setting an event callback for the web view control.

Only one event callback can be set for the web view control, and generally, the application may set the event callback for the web view control by using a web view delegate, obtain a corresponding callback notification, and process the callback notification. Therefore, in this application, an additional web registration and callback interface may be added to the operating system of the intelligent terminal, and the event callback may be set for the web view control by using the web registration and callback interface. Because the event callback is set for the web view control without using the web view delegate in this application, a problem that the event callback set by the application for the web view control fails may be avoided.

In a third optional implementation of the first aspect, the method of sending the obtained web content displayed by the web view control to the operating system of the intelligent terminal includes: sending the obtained web content to the operating system by using a web content receive interface of the operating system.

In this application, a web content receive interface shared by multiple applications may be used to send the obtained web content to the operating system of the intelligent terminal, so that the operating system completes collection of data generated when the application runs.

In a fourth optional implementation of the first aspect, the method of obtaining the web content displayed by the web view control includes: injecting a preset script language into the web view control after determining that the operating system of the intelligent terminal invokes the web content loading complete function; and executing the script language to obtain the web content.

In this application, the preset script language may be injected into the web view control after it is determined that the operating system of the intelligent terminal invokes the web content loading complete function; and the script language is executed to obtain the web content displayed by the web view control.

In this application, when the user triggers the running application so that a new application interface needs to be created, the intelligent terminal may create the application interface for the application by invoking a window creation function of the operating system of the intelligent terminal, and when creating the application interface, load code for implementing the method for obtaining web content according to this embodiment of the present invention, to a running environment of the application. Therefore, without modifying the application, it may be ensured that the operating system of the intelligent terminal obtains the web content displayed on the display interface of the intelligent terminal when the application runs, that is, it is ensured that the intelligent terminal obtains the web content displayed on the display interface of the intelligent terminal when the application runs.

According to a second aspect, an apparatus for obtaining web content is provided, and the apparatus includes a determining module, a registration and callback module, an obtaining module, and a callback processing module, where the determining module is configured to determine a web view control corresponding to web content displayed on a first display interface that is displayed on an intelligent terminal when an application runs on the intelligent terminal; the registration and callback module is configured to register a web content loading complete function with an operating system of the intelligent terminal, and determine that the operating system invokes the web content loading complete function, where the operating system invokes the web content loading complete function after determining that the web content displayed by the web view control determined by the determining module is loaded completely; the obtaining module is configured to obtain, after the registration and callback module determines that the operating system invokes the web content loading complete function, the web content displayed by the web view control; and the callback processing module is configured to send the web content obtained by the obtaining module to the operating system.

In a first optional implementation of the second aspect, the determining module is specifically configured to: determine that the operating system of the intelligent terminal invokes a redraw notification interface, where the operating system invokes the redraw notification interface when an interface currently displayed on a display screen of the intelligent terminal (namely, a current display interface of the intelligent terminal) changes; and after determining that the operating system invokes the redraw notification interface, traverse controls corresponding to content displayed on the first display interface after the change, so as to determine the web view control corresponding to the web content displayed on the first display interface.

In a second optional implementation of the second aspect, the registration and callback module is specifically configured to register the web content loading complete function with the operating system by using a web registration and callback interface of the operating system of the intelligent terminal, and determine, by using the web registration and callback interface of the operating system, that the operating system invokes the web content loading complete function.

In a third optional implementation of the second aspect, the callback processing module is specifically configured to send the web content obtained by the obtaining module to the operating system by using a web content receive interface of the operating system of the intelligent terminal.

In a fourth optional implementation of the second aspect, the obtaining module is specifically configured to: after the registration and callback module determines that the operating system invokes the web content loading complete function, inject a preset script language into the web view control, and execute the script language to obtain the web content displayed by the web view control.

According to a third aspect, an intelligent terminal is provided, and the intelligent terminal includes at least one processor, an interface circuit, a memory, and a system bus, where the memory is configured to store a computer-executable instruction, the at least one processor, the interface circuit, and the memory are interconnected by the system bus, and when the intelligent terminal runs, the at least one processor executes the computer-executable instruction stored in the memory, so that the intelligent terminal performs the method for obtaining web content according to any one of the first aspect or each optional implementation of the first aspect.

According to a fourth aspect, a computer-readable storage medium is provided, where the computer-readable storage medium stores one or more programs, the one or more programs include a computer-executable instruction, and when at least one processor of an intelligent terminal executes the computer-executable instruction, the intelligent terminal performs the method for obtaining web content according to any one of the first aspect or each optional implementation of the first aspect.

For technical effects of the second aspect and each optional implementation of the second aspect, the third aspect, and the fourth aspect, refer to the descriptions about the technical effects of the first aspect and each optional implementation of the first aspect. Details are not further described herein.

BRIEF DESCRIPTION OF DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention.

DESCRIPTION OF EMBODIMENTS

The term "and/or" in this specification describes only an association relationship for describing associated objects and represents that three relationships may exist. For example, A and/or B may represent the following three cases: Only A exists, both A and B exist, and only B exists.

In the embodiments of the present invention, terms such as "an example" or "for example" are used to represent examples, illustrations, or explanations. Any embodiment or design solution described as "an example" or "for example" in the embodiments of the present invention shall not be interpreted to be more preferential or advantageous than other embodiments or design solutions. Specifically, the terms such as "an example" or "for example" are intended to present related concepts in a specific manner.

In descriptions of the present invention, "multiple" means two or more than two unless otherwise specified. For example, multiple web view controls are two or more than two web view controls, and multiple applications are two or more than two applications.

The following describes the technical solutions in the embodiments of the present invention in detail with reference to the accompanying drawings in the embodiments of the present invention. Apparently, the described embodiments are merely some but not all of the embodiments of the present invention.

A method and an apparatus for obtaining web content according to the embodiments of the present invention may be applied to an intelligent terminal. The intelligent terminal may obtain a lot of user information, for example, a name, an age, a home address, and preferences (such as music, videos, eating, and shopping) of a user. On a basis of the user information obtained by the intelligent terminal, the intelligent terminal may recommend some useful content to the user with reference to actual usage of the intelligent terminal by the user. For example, assuming that at about 12:00 noon, when the intelligent terminal learns that the user is near a food street, the intelligent terminal may recommend, to the user according to eating preferences of the user, some food or restaurants that comply with the eating preferences of the user. For example, assuming that the intelligent terminal learns that an eating preference of the user is Sichuan cuisine, the intelligent terminal may recommend, to the user, several Sichuan restaurants that have best comments in the food street.

Figure 1:
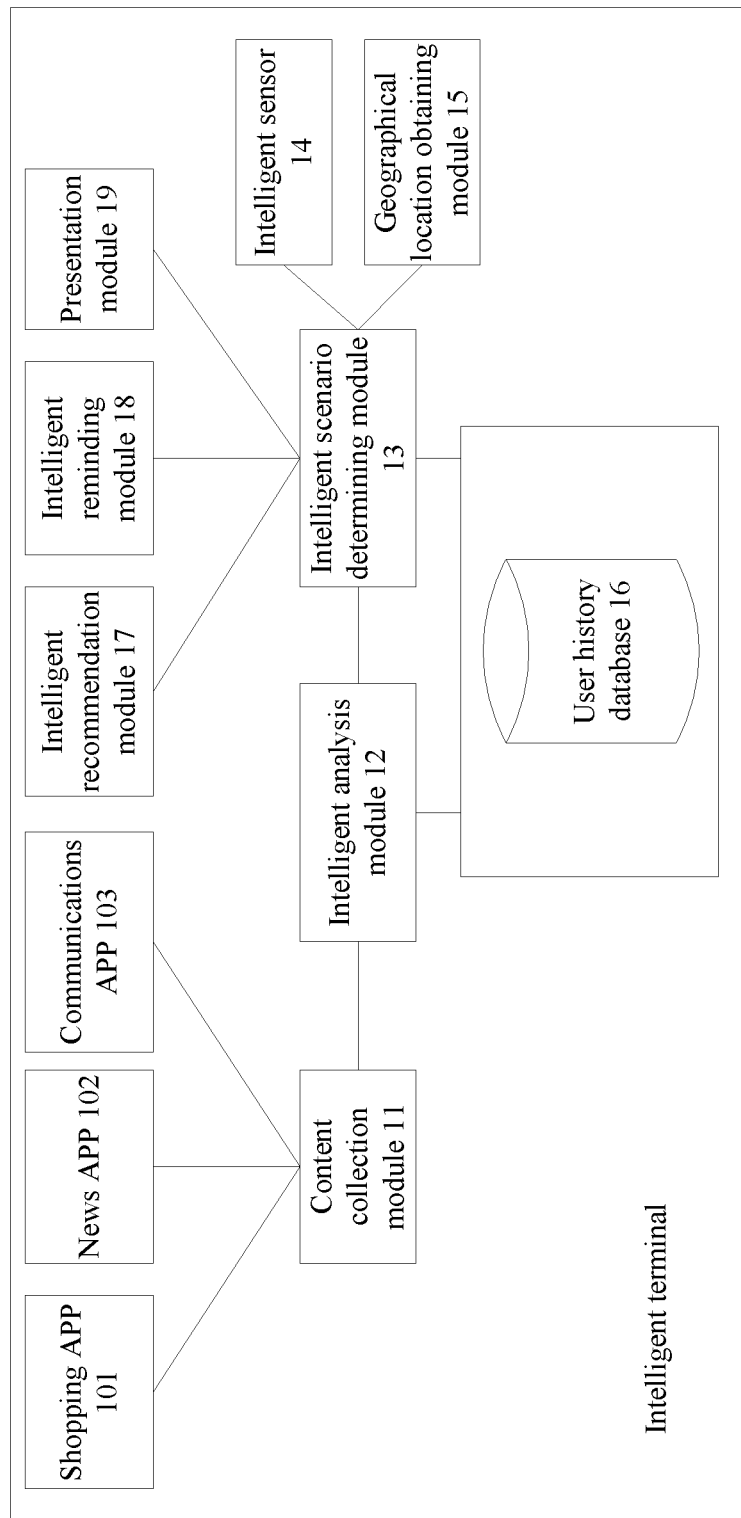
FIG. 1 is a schematic structural diagram of an intelligent terminal according to an embodiment of the present invention.

As shown in FIG. 1, FIG. 1 is a schematic structural diagram of an intelligent terminal according to an embodiment of the present invention. The intelligent terminal includes multiple applications, for example, a shopping application 101, a news application 102, and a communications application 103; and a content collection module 11, an intelligent analysis module 12, an intelligent scenario determining module 13, an intelligent sensor 14, a geographical location obtaining module 15, a user history database 16, an intelligent recommendation module 17, an intelligent reminding module 18, and a presentation module 19. As shown in FIG. 1, when a user uses each application, the content collection module 11 may collect data generated when the user uses each application, and sends the data to the intelligent analysis module 12 for analytical processing. The intelligent analysis module 12 saves the data to the user history database 16 after performing analytical processing on the data. When the user uses an application, the intelligent terminal performs unified analysis on statuses of the application, the user history database 16, and the intelligent sensor 14, a geographical location of the intelligent terminal that is obtained by the geographical location obtaining module 15, and the like, to obtain actual usage of the intelligent terminal by the user. Then, with reference to the user preferences, the intelligent terminal presents, to the user by using the intelligent recommendation module 17, the intelligent reminding module 18, or the presentation module 19, some content that complies with the user preferences.

In an actual implementation of the intelligent terminal shown in FIG. 1, the intelligent terminal needs to obtain the data generated when the user uses each application. However, with development of a hypertext markup language (hyper text markup language, HTML) 5 technology, more applications use a hybrid framework. A core implementation of the hybrid framework is that the application on the intelligent terminal uses a web view (web view), and presents a display interface by using the HTML. In this scenario, to obtain the data generated when the user uses the application, the intelligent terminal needs to obtain web content displayed on a display interface that is displayed on a display screen of the intelligent terminal when the user uses the application (that is, web content displayed by a web view control on the display interface that is displayed on the display screen of the intelligent terminal).

For ease of description, in this embodiment of the present invention, the interface displayed on the display screen of the intelligent terminal may be referred to as a display interface of the intelligent terminal. For example, an interface currently displayed on the display screen of the intelligent terminal, mentioned in the following embodiment, may be referred to as a current display interface of the intelligent terminal; and a first display interface displayed on the display screen of the intelligent terminal when the application runs, mentioned in the following embodiment, may be referred to as a first display interface of the intelligent terminal.

To enable the intelligent terminal to obtain the web content displayed on the display interface of the intelligent terminal when the user uses the application (or the application runs), an embodiment of the present invention provides a method and an apparatus for obtaining web content.

The method for obtaining web content according to this embodiment of the present invention may be performed by the apparatus for obtaining web content (referred to as an obtaining apparatus for ease of description in all the following method embodiments). The apparatus for obtaining web content may be a component, firmware, or an independent functional module that can implement the method for obtaining web content, or may be the content collection module 11 shown in FIG. 1, or a component, firmware, or an functional module that is integrated with the content collection module 11 and can implement the method for obtaining web content, or may be an intelligent terminal, or a component, firmware, or an functional module that is integrated with an intelligent terminal and can implement the method for obtaining web content. Specifically, this may be determined according to an actual use requirement or an application scenario, and is not limited in this embodiment of the present invention.

Figure 2:
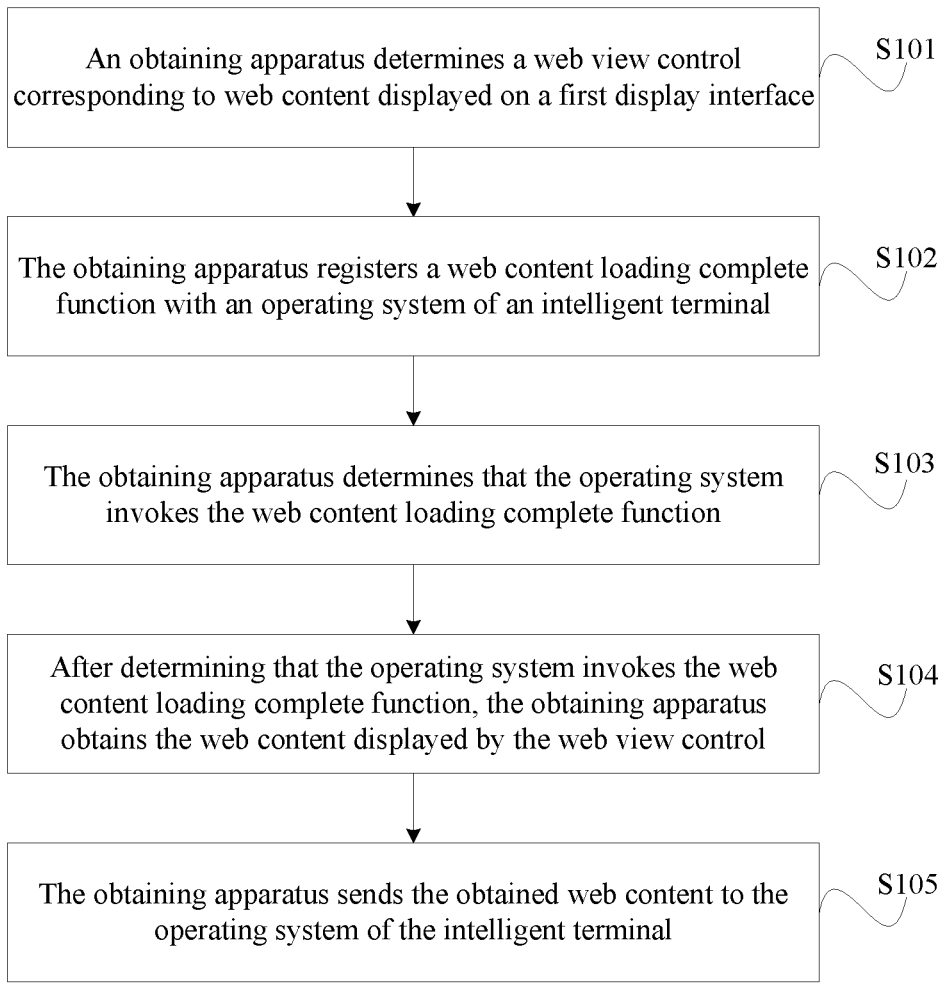
FIG. 2 is a schematic diagram 1 of a method for obtaining web content according to an embodiment of the present invention.

As shown in FIG. 2, an embodiment of the present invention provides a method for obtaining web content. The method includes the following steps.

S101. An obtaining apparatus determines a web view control corresponding to web content displayed on a first display interface.

The first display interface is an interface displayed on a display screen of an intelligent terminal when an application runs on the intelligent terminal.

In this embodiment of the present invention, the application may be any application installed on the intelligent terminal, for example, a shopping application, a news application, or a communications application.

That the application runs may be specifically that the application runs on a foreground of the intelligent terminal. For example, if an interface currently displayed on the display screen of the intelligent terminal (namely, a current display interface of the intelligent terminal) is an interface of an application, it indicates that the application is an application that runs on the foreground of the intelligent terminal. For the application that runs on the foreground of the intelligent terminal, after the intelligent terminal receives a message of the application, the intelligent terminal may directly display the message on the interface of the application (namely, the current display interface of the intelligent terminal).

When a user uses an application, that is, when the application runs, because the user triggers the application, the current display interface of the intelligent terminal may change continuously. In this embodiment of the present invention, after the current display interface of the intelligent terminal changes, the intelligent terminal triggers the obtaining apparatus to perform the method for obtaining web content according to this embodiment of the present invention. Specifically, when the current display interface of the intelligent terminal changes, the intelligent terminal triggers the obtaining apparatus to search for the web view control on the first display interface displayed on the display screen of the intelligent terminal (namely, the first display interface of the intelligent terminal). After the obtaining apparatus finds, from the first display interface, the web view control corresponding to the web content displayed on the first display interface, the obtaining apparatus may determine the web view control corresponding to the web content displayed on the first display interface. Specifically, the obtaining apparatus may first determine all controls corresponding to content displayed on the first display interface of the intelligent terminal, and then determine, from the controls, the web view control corresponding to the web content displayed on the first display interface.

In this embodiment of the present invention, because the display interface of the intelligent terminal (including the current display interface of the intelligent terminal and the first display interface of the intelligent terminal) is an interface displayed on the display screen of the intelligent terminal, the controls corresponding to the content displayed on the display interface of the intelligent terminal may also be understood as controls on the display interface of the intelligent terminal.

Optionally, in this embodiment of the present invention, the obtaining apparatus may determine a control on the display interface of the intelligent terminal according to coordinates of the control on the display screen of the intelligent terminal. For example, if coordinates of a control are within a range of the display screen of the intelligent terminal, it indicates that the control is a control on the display interface of the intelligent terminal. After determining the controls on the display interface of the intelligent terminal, the obtaining apparatus determines the web view control from the controls.

The control is a control of data and methods. The control may have its own attributes and methods. The attributes are used for simple access to control data. The methods are some simple and visible functions of the control. The control generally includes a text control, a picture control, a web view control, and the like. The web view control is a control that can directly load web content. For example, in some application scenarios, when a text control, a button control, or a picture control is triggered, the application re-creates a new display interface, and displays corresponding web content on the display interface by using the web view control.

Figure 3:
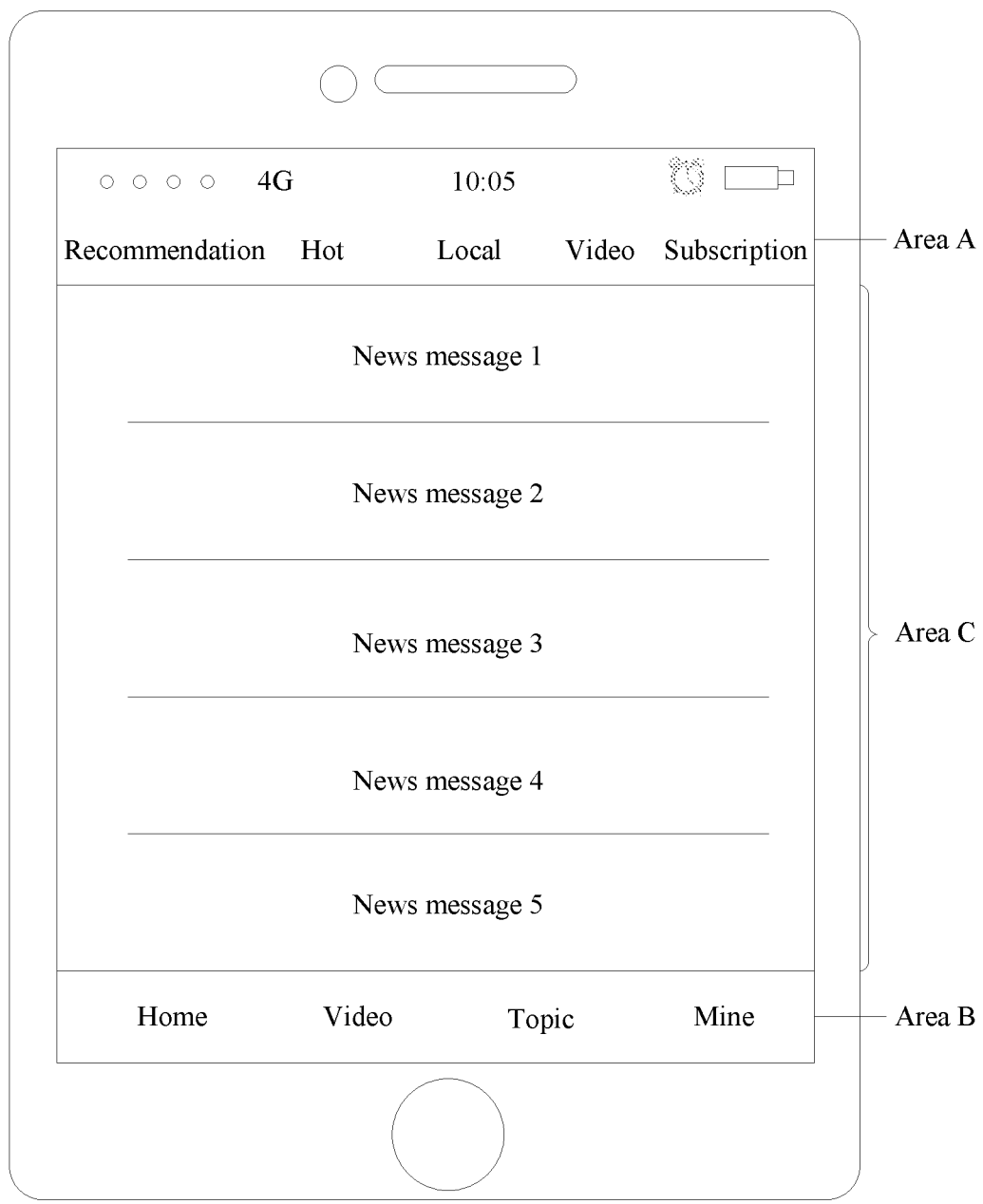
FIG. 3 is a schematic diagram of a display interface of an intelligent terminal according to an embodiment of the present invention.

As shown in FIG. 3, FIG. 3 is a schematic diagram of a display interface of an intelligent terminal when a news application runs. In FIG. 3, options (such as recommendation, hot, local, video, and subscription) in area A, options (such as home, video, topic and mine) in area B, and news messages (such as a news message 1, a news message 2, a news message 3, a news message 4, and a news message 5) in area C, are all text controls or picture controls. When the user needs to read a news message in area C, for example, the news message 1, the news message is triggered. In this case, the application re-creates a new display interface, and displays, on the display interface by using the web view control, web content corresponding to the news message 1.

S102. The obtaining apparatus registers a web content loading complete function with an operating system of an intelligent terminal.

Optionally, a sequence of performing S101 and S102 may not be limited in this embodiment of the present invention. That is, in this embodiment of the present invention, S101 may be first performed, and then S102 is performed; or S102 may be first performed, and then S101 is performed; or S101 and S102 may be performed simultaneously.

Preferably, to save resources of the obtaining apparatus and the intelligent terminal, in this embodiment of the present invention, S102 may be performed after S101 is performed.

S103. The obtaining apparatus determines that the operating system invokes the web content loading complete function.

The operating system invokes the web content loading complete function after determining that the web content displayed by the web view control is loaded completely.

Because when the application uses a web view for displaying, the application loads the web content displayed by the web view control, the obtaining apparatus cannot learn when the web content displayed by the web view control is loaded completely. Therefore, the obtaining apparatus needs to register, with the operating system of the intelligent terminal, the web content loading complete function stored in the obtaining apparatus. Therefore, when the operating system determines that the web content displayed by the web view control is loaded completely, the operating system responds to the event that the web content is loaded completely, that is, the operating system invokes the web content loading complete function.

A person skilled in the art may understand that, because the application runs in the operating system of the intelligent terminal, after the application completely loads the web content displayed by the web view control, the operating system of the intelligent terminal may learn the event that the web content displayed by the web view control is loaded completely, that is, the operating system of the intelligent terminal may determine that the web content displayed by the web view control is loaded completely.

It should be noted that, an event callback mechanism is used in S102 and S103, that is, the obtaining apparatus registers a function with the operating system of the intelligent terminal, where the function is invoked by the operating system only when a specific event occurs, so that when the operating system invokes the function, the obtaining apparatus may learn that the specific event occurs.

With reference to the event callback mechanism, in this embodiment of the present invention, to ensure integrity of the web content obtained by the obtaining apparatus in the process of obtaining the web content, the obtaining apparatus starts to obtain the web content only after all the web content displayed by the web view control is loaded completely. Therefore, the specific event in this embodiment of the present invention is that the web content displayed by the web view control is loaded completely. After the obtaining apparatus registers, with the operating system of the intelligent terminal, the web content loading complete function stored in the obtaining apparatus, when the web content displayed by the web view control is loaded completely, the operating system of the intelligent terminal responds to the specific event, that is, the operating system of the intelligent terminal invokes the web content loading complete function. Because the web content loading complete function (specifically, code for implementing the web content loading complete function) is stored in the obtaining apparatus, when the operating system invokes the web content loading complete function, the obtaining apparatus may learn that the operating system invokes the web content loading complete function. Therefore, the obtaining apparatus may learn that the web content displayed by the web view control is loaded completely.

S104. After determining that the operating system invokes the web content loading complete function, the obtaining apparatus obtains the web content displayed by the web view control.

After the obtaining apparatus determines that the operating system of the intelligent terminal invokes the web content loading complete function, the obtaining apparatus may determine that the web content displayed by the web view control is loaded completely. Therefore, the obtaining apparatus may start to obtain the web content displayed by the web view control.

S105. The obtaining apparatus sends the obtained web content to the operating system of the intelligent terminal.

After the obtaining apparatus obtains the web content displayed by the web view control, the obtaining apparatus may send the obtained web content to the operating system of the intelligent terminal, that is, the operating system of the intelligent terminal obtains the web content displayed by the web view control on the display interface of the intelligent terminal when the application runs.

Optionally, in this embodiment of the present invention, there may be one or more web view controls on the first display interface. Specifically, a method for obtaining web content displayed by each of multiple web view controls is similar to the method for obtaining web content according to this embodiment of the present invention, and is not further described in detail in this embodiment of the present invention.

In this embodiment of the present invention, after determining the web view control on the first display interface displayed on the display screen of the intelligent terminal when the application runs, the obtaining apparatus registers the web content loading complete function with the operating system of the intelligent terminal. This may ensure that, after all web content displayed by the web view control is loaded completely, the operating system may invoke the web content loading complete function to respond to the event that the web content is loaded completely. That is, if it is determined that the operating system invokes the web content loading complete function, the obtaining apparatus may determine that the web content is loaded completely. Therefore, it may be ensured that the obtaining apparatus starts to obtain the web content only after all the web content is loaded completely, and sends the obtained web content to the operating system. Therefore, the operating system may obtain the web content displayed on the display interface of the intelligent terminal when the application runs, and the intelligent terminal can obtain the web content displayed on the display interface when the application runs.

Figure 4:
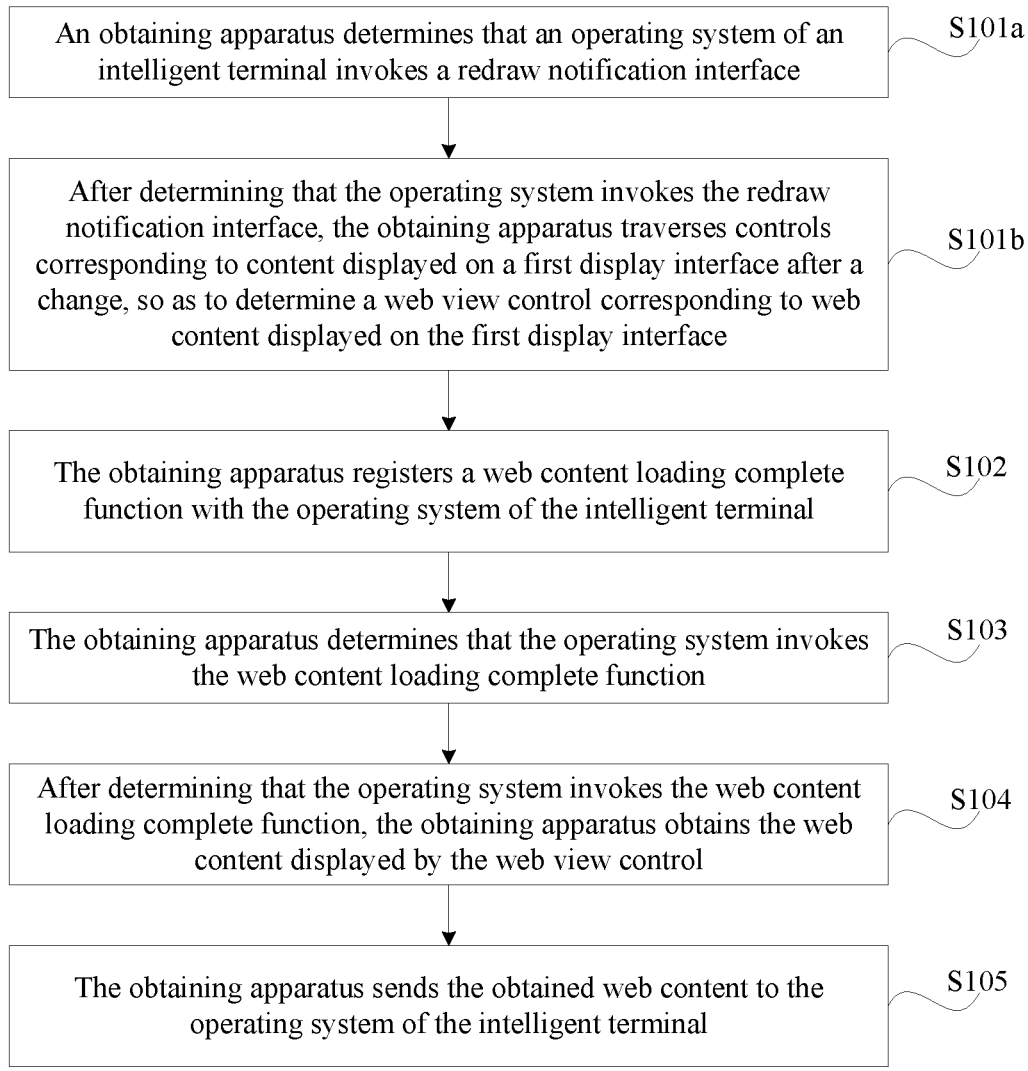
FIG. 4 is a schematic diagram 2 of a method for obtaining web content according to an embodiment of the present invention.

Optionally, with reference to FIG. 2, as shown in FIG. 4, in the method for obtaining web content according to this embodiment of the present invention, S101 may specifically include the following steps:

S101a. The obtaining apparatus determines that the operating system of the intelligent terminal invokes a redraw notification interface.

The operating system invokes the redraw notification interface when the current display interface changes, and the current display interface is the interface currently displayed on the display screen of the intelligent terminal.

S101b. After determining that the operating system invokes the redraw notification interface, the obtaining apparatus traverses controls corresponding to content displayed on the first display interface after the change, so as to determine the web view control corresponding to the web content displayed on the first display interface.

In this embodiment of the present invention, during running of the application, when the interface currently displayed on the display screen of the intelligent terminal (namely, the current display interface of the intelligent terminal) changes, for example, when the current display interface of the intelligent terminal is updated to the first display interface, the operating system of the intelligent terminal invokes the redraw notification interface. Because the redraw notification interface (specifically, code for implementing the redraw notification interface) is stored in the obtaining apparatus, when the operating system invokes the redraw notification interface, the obtaining apparatus may learn that the operating system invokes the redraw notification interface. Therefore, the obtaining apparatus may learn that the current display interface of the intelligent terminal changes. Further, the obtaining apparatus may traverse the controls corresponding to the content displayed on the first display interface after the change, so as to determine, from the controls, the web view control corresponding to the web content displayed on the first display interface.

It should be noted that, the event callback mechanism is also used in S101a and S101b. Specifically, for descriptions about the event callback mechanism, refer to descriptions about S102 and S103. Details are not further described herein. Different from S102 and S103, on one hand, in this embodiment of the present invention, as shown in FIG. 5, the registration process in an event callback used in this embodiment of the present invention may be implemented by adding or inserting a redraw notification interface 202 into the traverse and redraw function 201 (for example, inserting an interface name of the redraw notification interface 202 into the traverse and redraw function 201); on the other hand, in S101a and S101b, the specific event in the event callback mechanism is that the current display interface of the intelligent terminal changes.

Figure 5:
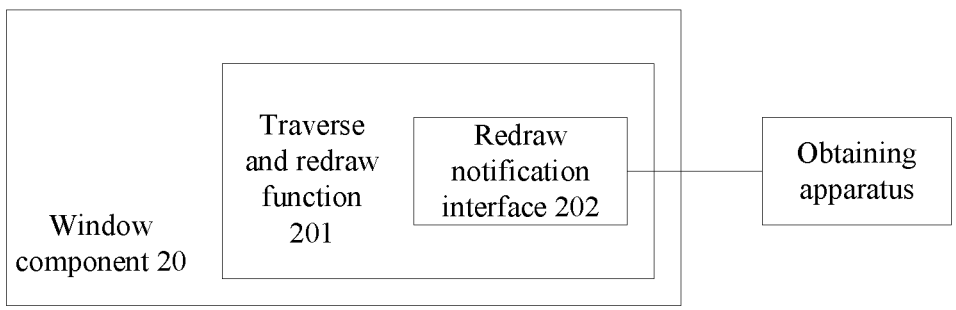
FIG. 5 is a schematic diagram 1 of interactions between an operating system of an intelligent terminal and an obtaining apparatus according to an embodiment of the present invention.

With reference to the event callback mechanism, in this embodiment of the present invention, as shown in FIG. 5, when the operating system determines that the current display interface of the intelligent terminal changes, the operating system invokes the redraw notification interface 202. Because the redraw notification interface 202 (specifically, code for implementing the redraw notification interface 202) is stored in the obtaining apparatus, when the operating system invokes the redraw notification interface 202, the obtaining apparatus may learn that the operating system invokes the redraw notification interface 202. Therefore, the obtaining apparatus may learn that the current display interface of the intelligent terminal changes. That is, by invoking the redraw notification interface 202, the operating system may notify the obtaining apparatus that the current display interface of the intelligent terminal changes.

For detailed descriptions about the control and the web view control, refer to the descriptions about the control and the web view control in the embodiment shown in FIG. 2. Details are not further described herein.

In a specific implementation of this embodiment of the present invention, for example, as shown in FIG. 5, when the current display interface of the intelligent terminal changes, the operating system of the intelligent terminal (specifically, a window component 20 in the operating system) further executes the traverse and redraw function 201 to traverse the controls corresponding to the content displayed on the first display interface, calculate sizes of the controls, and redraw the display interface of the intelligent terminal.

The component is a control of data and methods. The component may have its own attributes and methods. The attributes are used for simple access to component data. The methods are some simple and visible functions of the component. The control is a component. Specifically, the control is a component having a user interface (user interface, UI).

Optionally, in this embodiment of the present invention, with reference to S101b, after the obtaining apparatus determines that the operating system of the intelligent terminal invokes the redraw notification interface, the obtaining apparatus may convert the event that the operating system invokes the redraw notification interface into a traversal event, and then the obtaining apparatus performs the traversal event. That is, the obtaining apparatus traverses the controls corresponding to the content displayed on the first display interface, so as to determine the web view control corresponding to the web content displayed on the first display interface. In comparison with S101b, in this method, after the obtaining apparatus determines that the current display interface of the intelligent terminal changes (that is, the current display interface is updated to the first display interface), the obtaining apparatus delays traversing the controls corresponding to the content displayed on the first display interface, that is, after waiting for the first display interface to be completely redrawn (namely, refreshed), the obtaining apparatus traverses the controls corresponding to the content displayed on the first display interface; therefore, a response speed of the first display interface may be increased when the obtaining apparatus traverses the first display interface.

In the foregoing method, because the obtaining apparatus may accurately determine the web view control corresponding to the web content displayed on the display interface (namely, the first display interface) of the intelligent terminal when the application runs, the obtaining apparatus can accurately obtain the web content displayed by the web view control.

Figure 6:
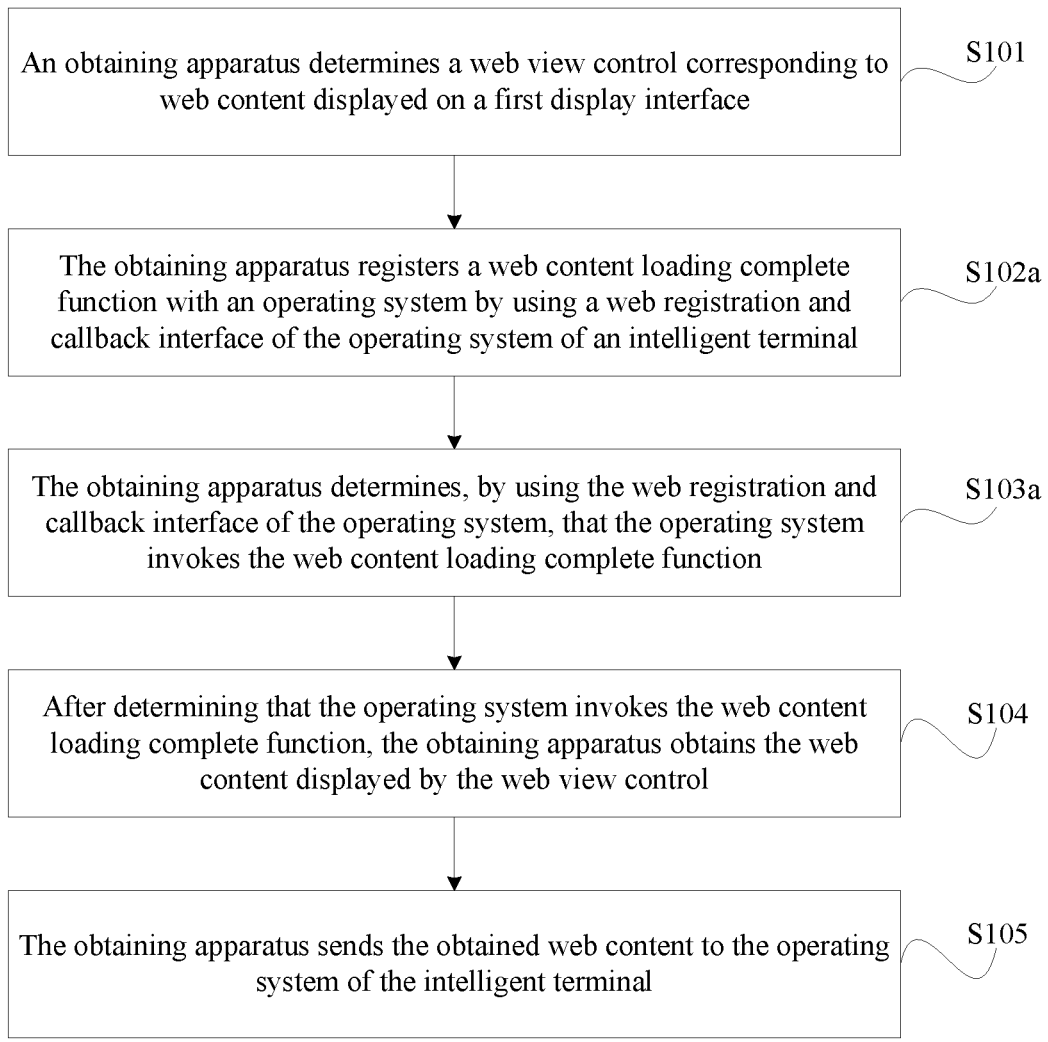
FIG. 6 is a schematic diagram 3 of a method for obtaining web content according to an embodiment of the present invention.

Optionally, with reference to FIG. 2, as shown in FIG. 6, in the method for obtaining web content according to this embodiment of the present invention, S102 and S103 may specifically include:

S102a. The obtaining apparatus registers the web content loading complete function with the operating system by using a web registration and callback interface of the operating system of the intelligent terminal.

S103a. The obtaining apparatus determines, by using the web registration and callback interface of the operating system, that the operating system invokes the web content loading complete function.

That the obtaining apparatus registers a web content loading complete function with an operating system of an intelligent terminal, and that the obtaining apparatus determines that the operating system invokes the web content loading complete function may be referred to as "the obtaining apparatus sets an event callback for the web view control". Specifically, for descriptions about the event callback, that is, how the obtaining apparatus registers the web content loading complete function with the operating system of the intelligent terminal, and the obtaining apparatus determines that the operating system invokes the web content loading complete function, refer to the descriptions about S102 and S103. Details are not further described herein.

In a specific implementation of this embodiment of the present invention, only one event callback can be set for the web view control, and generally, the application may set the event callback for the web view control by using a web view delegate (web view client), obtain a corresponding callback notification, and process the callback notification. Therefore, in this embodiment of the present invention, to avoid a problem that the event callback set by the application for the web view control fails because the obtaining apparatus sets the event callback for the web view control by using the web view delegate, an additional web registration and callback interface may be added to the operating system of the intelligent terminal. Therefore, the obtaining apparatus may set the event callback for the web view control by using the web registration and callback interface, as shown in S102a and S103a.

Figure 7:
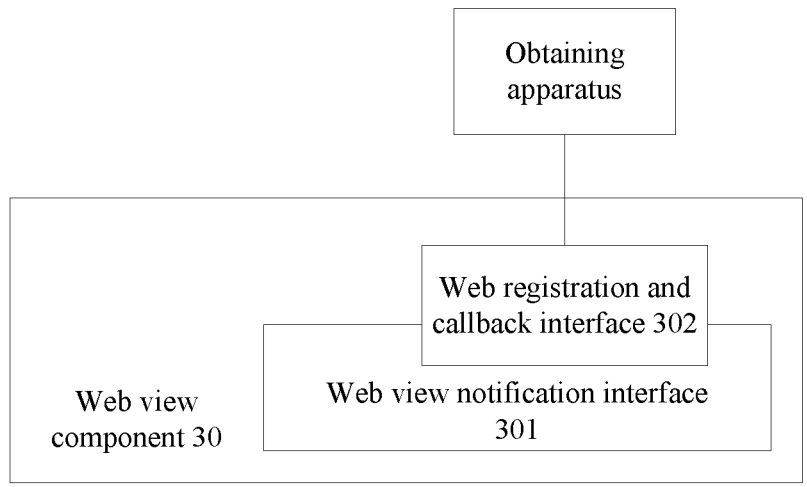
FIG. 7 is a schematic diagram 2 of interactions between an operating system of an intelligent terminal and an obtaining apparatus according to an embodiment of the present invention.

For example, as shown in FIG. 7, a web view component 30 in the operating system of the intelligent terminal includes a web view notification interface 301. The web view notification interface 301 provides a web registration and callback interface 302, and the obtaining apparatus may set the event callback for the web view control by using the web registration and callback interface 302.

Optionally, the web content loading complete function may be implemented by using the following statement:
public void onPageFinished(WebView view, String url).

In the foregoing method, because the obtaining apparatus may set the event callback for the web view control by using the web registration and callback interface of the operating system of the intelligent terminal, the obtaining apparatus may set the event callback for the web view control without using the web view delegate, thereby avoiding a problem that the event callback set by the application for the web view control fails.

Figure 8:
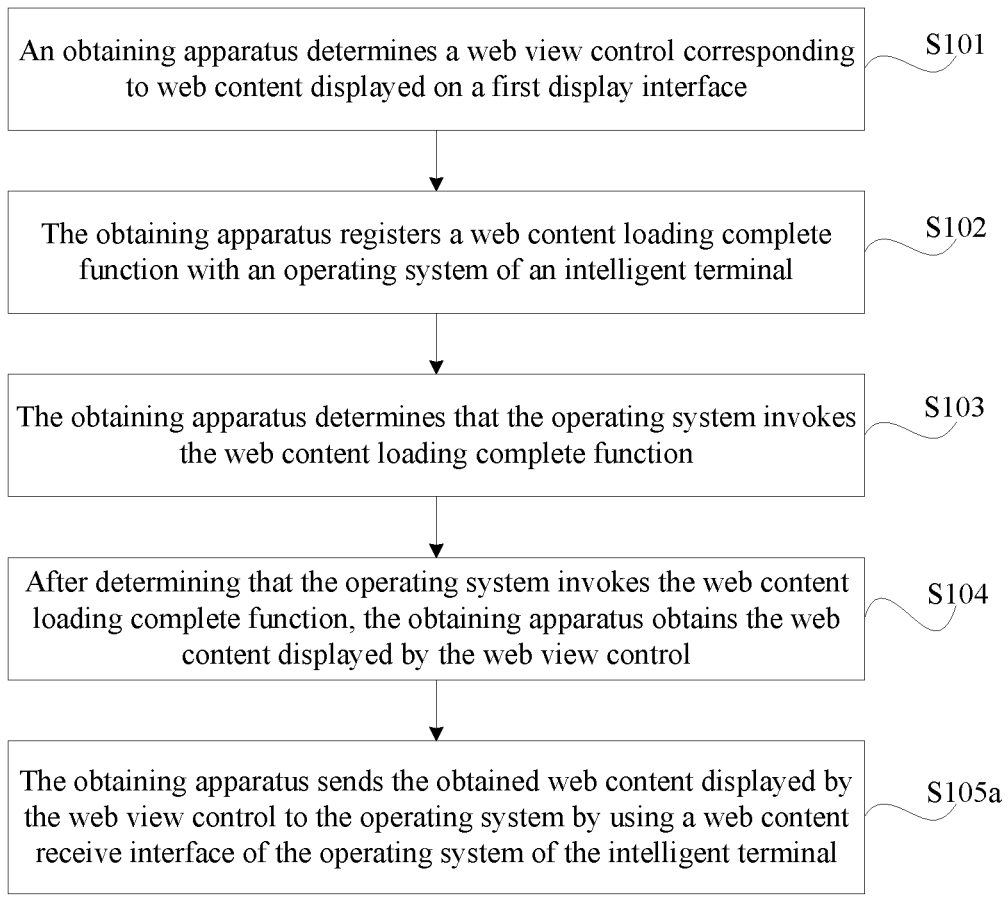
FIG. 8 is a schematic diagram 4 of a method for obtaining web content according to an embodiment of the present invention.

Optionally, with reference to FIG. 2, as shown in FIG. 8, in the method for obtaining web content according to this embodiment of the present invention, S105 may specifically include:

S105a. The obtaining apparatus sends the obtained web content displayed by the web view control to the operating system by using a web content receive interface of the operating system of the intelligent terminal.

Optionally, in this embodiment of the present invention, the obtaining apparatus may send the web content obtained by the obtaining apparatus to the operating system of the intelligent terminal by using a web content receive interface shared by multiple applications, so that the operating system completes collection of data generated when the application runs.

Figure 9:
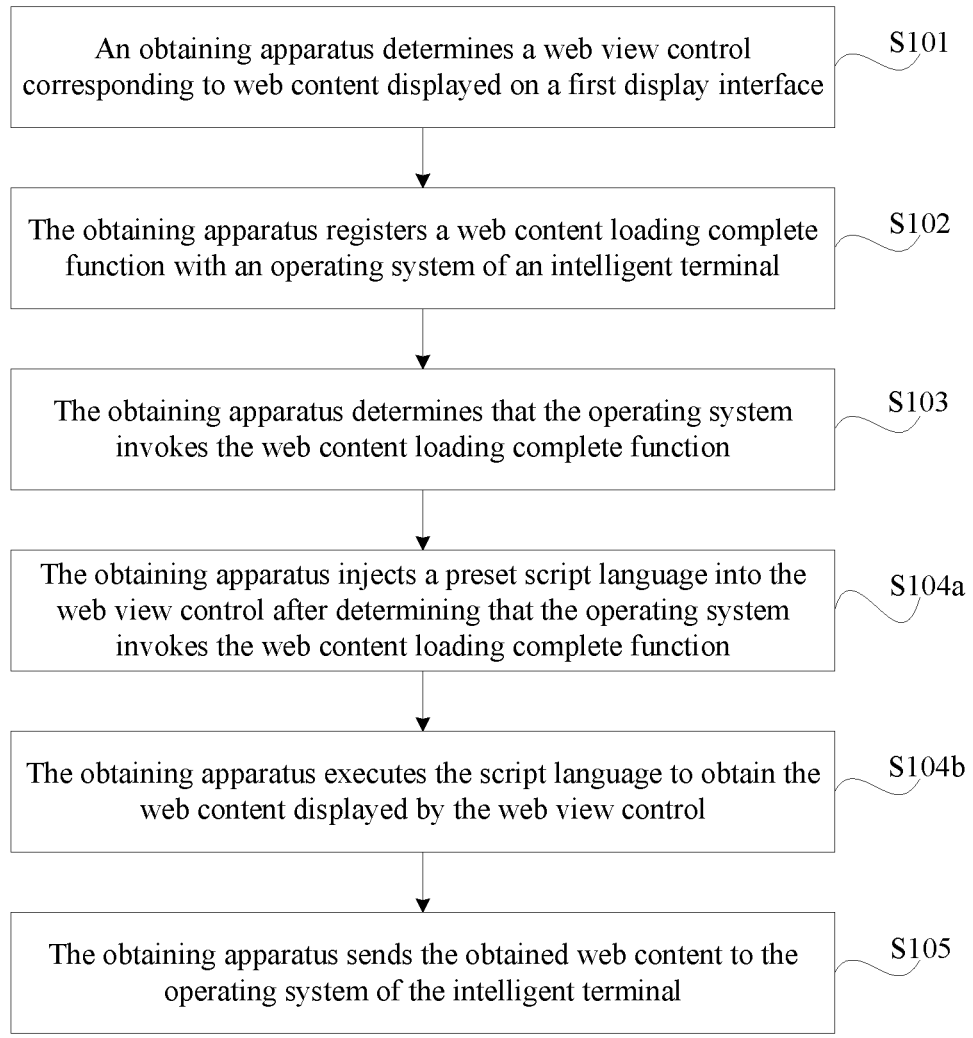
FIG. 9 is a schematic diagram 5 of a method for obtaining web content according to an embodiment of the present invention.

Optionally, with reference to FIG. 2, as shown in FIG. 9, in the method for obtaining web content according to this embodiment of the present invention, S104 may specifically include:

S104a. The obtaining apparatus injects a preset script language into the web view control after determining that the operating system invokes the web content loading complete function.

S104b. The obtaining apparatus executes the script language to obtain the web content displayed by the web view control.

In S104a, after determining that the operating system of the intelligent terminal invokes the web content loading complete function, the obtaining apparatus may determine that the web content displayed by the web view control is loaded completely, and therefore, the obtaining apparatus may inject the preset script language into the web view control.

Optionally, that the obtaining apparatus injects a preset script language into the web view control in S104a may be implemented by using the following statement:
public void evaluateJavascript(String script, ValueCallback<String>resultCallback);

where an input parameter script in the statement is the preset script language, the script language is used to obtain the web content displayed by the web view control, and a return parameter resultCallback in the statement returns a callback function ValueCallback. The callback function includes the obtained web content displayed by the web view control.

Optionally, the callback function may be specifically implemented by using the following statement:

public abstract void onReceiveValue (String value);

where a parameter value in the statement is the obtained web content displayed by the web view control.

In the foregoing method, the obtaining apparatus may inject the preset script language into the web view control, and execute the script language to obtain the web content displayed by the web view control.

Optionally, in this embodiment of the present invention, when the user triggers the running application so that a new application interface needs to be created, the intelligent terminal first creates the application interface for the application by invoking a window creation function of the operating system of the intelligent terminal, and when creating the application interface, loads code for implementing the method for obtaining web content according to this embodiment of the present invention, to a running environment of the application. Therefore, when the current display interface of the intelligent terminal changes, the intelligent terminal triggers the obtaining apparatus to execute the code to implement the method for obtaining web content according to this embodiment of the present invention. The application interface created by the intelligent terminal includes an interface that is already displayed on the display screen of the intelligent terminal (for example, the current display interface and the first display interface of the intelligent terminal in this embodiment of the present invention) and an interface that is not displayed yet on the display screen of the intelligent terminal.

Figure 10:
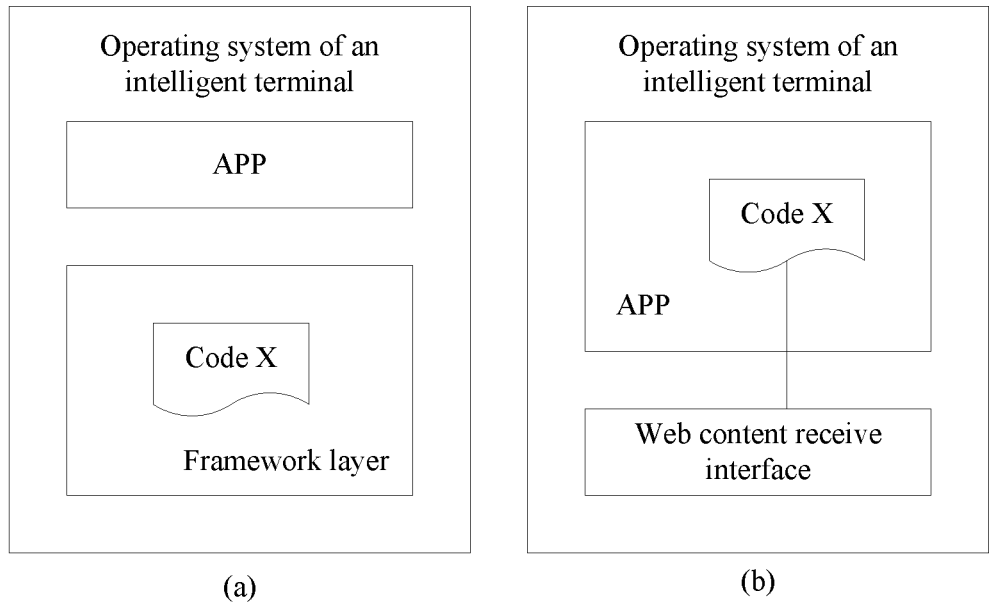
FIG. 10 is a schematic architecture diagram of an operating system of an intelligent terminal according to an embodiment of the present invention.

For example, as shown in FIG. 10, FIG. 10 is a schematic architecture diagram of an operating system of an intelligent terminal according to an embodiment of the present invention. In FIG. 10 (a), code (denoted by code X in FIG. 10) for implementing a method for obtaining web content according to this embodiment of the present invention is stored in a framework (framework) layer of the operating system of the intelligent terminal. In FIG. 10 (b), when a user triggers a running application so that a new application interface needs to be created, the intelligent terminal may create the application interface by invoking the foregoing window creation function, and when creating the application interface, load code X into a running environment of the application. Therefore, the intelligent terminal may trigger an obtaining apparatus to obtain, by executing code X, web content displayed on a display interface of the intelligent terminal when the application runs, and send the web content to the operating system by using a corresponding interface (for example, a web content receive interface illustrated in FIG. 10) in the operating system. Therefore, without modifying the application, it may be ensured that the operating system of the intelligent terminal obtains the web content displayed on the display interface of the intelligent terminal when the application runs, that is, it is ensured that the intelligent terminal obtains the web content displayed on the display interface of the intelligent terminal when the application runs.

In the method for obtaining web content according to this embodiment of the present invention, when the intelligent terminal creates a new application interface for the application by invoking the window creation function of the operating system of the intelligent terminal, the intelligent terminal may load, by using the window creation function, the code for implementing the method for obtaining web content according to this embodiment of the present invention, to the running environment of the application. Therefore, the obtaining apparatus may obtain, by executing the code in the running environment of the application, web content displayed by a web view control on the display interface (for example, a first display interface included in the application interface) of the intelligent terminal, and then the obtaining apparatus sends the obtained web content to the operating system. Therefore, the operating system can obtain the web content displayed on the display interface of the intelligent terminal when the application runs, and the intelligent terminal can obtain the web content displayed on the display interface of the intelligent terminal when the application runs.

Figure 11:
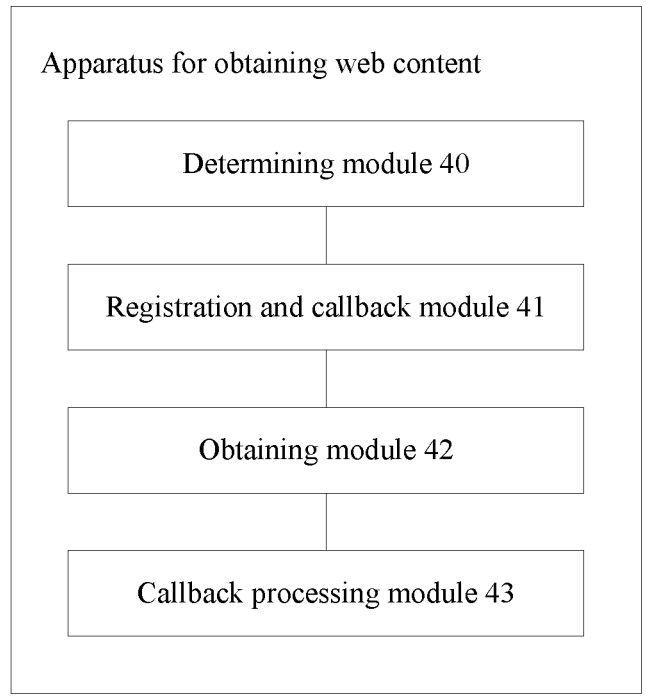
FIG. 11 is a schematic structural diagram of an apparatus for obtaining web content according to an embodiment of the present invention.

As shown in FIG. 11, an embodiment of the present invention provides an apparatus for obtaining web content. The apparatus is configured to perform the steps performed by the obtaining apparatus in the foregoing method embodiments. The apparatus may include modules corresponding to corresponding steps. For example, the apparatus may include a determining module 40, a registration and callback module 41, an obtaining module 42, and a callback processing module 43.

The determining module 40 is configured to determine a web view control corresponding to web content displayed on a first display interface, where the first display interface is an interface displayed on a display screen of the intelligent terminal when the application runs; the registration and callback module 41 is configured to register a web content loading complete function with an operating system of the intelligent terminal, and determine that the operating system invokes the web content loading complete function, where the operating system invokes the web content loading complete function after determining that the web content displayed by the web view control determined by the determining module 40 is loaded completely; the obtaining module 42 is configured to obtain the web content after the registration and callback module 41 determines that the operating system invokes the web content loading complete function; and the callback processing module 43 is configured to send the web content obtained by the obtaining module 42 to the operating system.

Optionally, the determining module 40 is specifically configured to: determine that the operating system invokes a redraw notification interface, where the operating system invokes the redraw notification interface when a current display interface changes, and the current display interface is an interface currently displayed on the display screen of the intelligent terminal; and after determining that the operating system invokes the redraw notification interface, traverse controls corresponding to content displayed on the first display interface after the change, so as to determine the web view control corresponding to the web content displayed on the first display interface.

Optionally, the registration and callback module 41 is specifically configured to register the web content loading complete function with the operating system by using a web registration and callback interface of the operating system, and determine, by using the web registration and callback interface of the operating system, that the operating system invokes the web content loading complete function.

Optionally, the callback processing module 43 is specifically configured to send the web content obtained by the obtaining module 42 to the operating system by using a web content receive interface of the operating system.

Optionally, the obtaining module 42 is specifically configured to: after the registration and callback module 41 determines that the operating system invokes the web content loading complete function, inject a preset script language into the web view control, and execute the script language to obtain the web content.

In this embodiment of the present invention, in a specific implementation, the determining module, the registration and callback module, the obtaining module, and the callback processing module may all be implemented by at least one processor.

It may be understood that, the apparatus for obtaining web content in this embodiment may correspond to the obtaining apparatus in the method for obtaining web content in the embodiment shown in FIG. 2, FIG. 4, FIG. 6, FIG. 8, or FIG. 9, and division and/or functions of the modules in the apparatus for obtaining web content in this embodiment is/are intended to implement the method procedure shown in FIG. 2, FIG. 4, FIG. 6, FIG. 8, or FIG. 9. To avoid repetition, details are not further described herein.

In this embodiment of the present invention, after determining the web view control on the first display interface displayed on the display screen of the intelligent terminal when the application runs, the obtaining apparatus registers the web content loading complete function with the operating system of the intelligent terminal. This may ensure that, after all web content displayed by the web view control is loaded completely, the operating system may invoke the web content loading complete function to respond to the event that the web content is loaded completely. That is, if it is determined that the operating system invokes the web content loading complete function, the obtaining apparatus may determine that the web content is loaded completely. Therefore, it may be ensured that the obtaining apparatus starts to obtain the web content only after all the web content is loaded completely, and sends the obtained web content to the operating system. Therefore, the operating system may obtain the web content displayed on the display interface of the intelligent terminal when the application runs, and the intelligent terminal can obtain the web content displayed on the display interface when the application runs.

An embodiment of the present invention provides an intelligent terminal, where multiple applications are installed in an operating system of the intelligent terminal. At least one of the multiple applications uses a web view for displaying. The intelligent terminal includes the apparatus for obtaining web content as shown in FIG. 11, and the apparatus may be configured to perform the method for obtaining web content as shown in FIG. 2, FIG. 4, FIG. 6, FIG. 8, or FIG. 9.

The intelligent terminal may include at least one processor, an interface circuit, a memory, and a system bus.

The memory is configured to store a computer-executable instruction. The at least one processor, the interface circuit, and the memory are interconnected by the system bus and communicate with each other. When the intelligent terminal runs, the at least one processor executes the computer-executable instruction stored in the memory, so that the intelligent terminal performs the method for obtaining web content as shown in FIG. 2, FIG. 4, FIG. 6, FIG. 8, or FIG. 9. For a specific method for obtaining web content, refer to the descriptions about the embodiment shown in FIG. 2, FIG. 4, FIG. 6, FIG. 8, or FIG. 9. Details are not further described herein.

Figure 12:
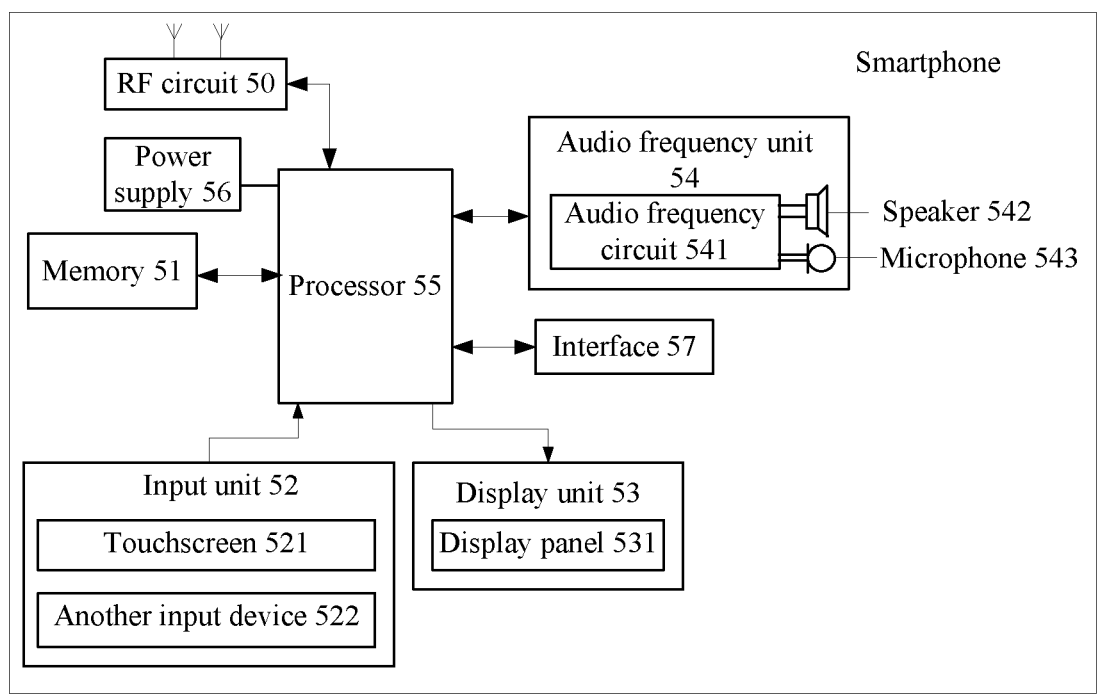
FIG. 12 is a schematic diagram of hardware of a smartphone according to an embodiment of the present invention.

The intelligent terminal may be an intelligent terminal device such as a smartphone, a tablet computer, a notebook computer, an ultra-mobile personal computer (ultra-mobile personal computer, UMPC), a netbook, or a personal digital assistant (personal digital assistant, PDA). This embodiment of the present invention is described by using an example in which the intelligent terminal is a smartphone. FIG. 12 shows a schematic block diagram of a part of a structure of a smartphone related to each embodiment of the present invention.

As shown in FIG. 12, the smartphone may specifically include components such as a radio frequency (radio frequency, RF) circuit 50, a memory 51, an input unit 52, a display unit 53, an audio frequency unit 54, a processor 55, a power supply 56, and an interface 57. A person skilled in the art may understand that the structure of the smartphone shown in FIG. 12 does not constitute a limitation on the smartphone. A specific quantity of components included in the smartphone may be greater or less than that shown in FIG. 12, or some components are combined, or different components are distributed in different positions.

The processor 55 may be the foregoing at least one processor. The memory 51 may be the foregoing memory. The RF circuit 50, the input unit 52, the audio frequency unit 54, the power supply 56, and the interface 57 may be the foregoing interface circuit. Connection lines connecting the components in FIG. 12 may be the foregoing system bus.

The following describes each component of the smartphone in detail with reference to FIG. 12.

The RF circuit 50 may be configured to receive or transmit signals in an information reception or transmission or call process, and in particular, after receiving a downlink signal, transmit the downlink signal to the processor 55 for processing, and in addition, transmit an uplink signal. Generally, the RF circuit includes but is not limited to an antenna, at least one amplifier, a transceiver, a coupler, a low noise amplifier (low noise amplifier, LNA), a duplexer, or the like. In addition, the RF circuit 50 may further communicate with a network and other devices through wireless communication. The wireless communication may use any communications standard or protocol, including but not limited to the Global System for Mobile Communication (global system of mobile communication, GSM), general packet radio service (general packet radio service, GPRS), Code Division Multiple Access (code division multiple access, CDMA), Wideband Code Division Multiple Access (wideband code division multiple access, WCDMA), Long Term Evolution (long term evolution, LTE), e-mail, short message service (short messaging service, SMS), and the like.

The memory 51 may be configured to store a software program and module. The processor 55 performs various function applications and signal processing of the smartphone by running the software program and module stored in the memory 51. The memory 51 may mainly include a program storage area and a data storage area. The program storage area may store an operating system of the smartphone, an application required by at least one function (such as an audio playing function or an image playing function), or the like. The data storage area may store data (such as audio data, image data, or a phone book) that is created according to usage of the smartphone, or the like. In addition, the memory 51 may include a high-speed random access memory, and may further include a non-volatile memory, for example, at least one magnetic disk storage, a flash memory, or other volatile solid state memories.

The input unit 52 may be configured to receive input digit or character information, and generate a key signal input related to a user setting and function control of the smartphone. Specifically, the input unit 52 may include a touchscreen 521 and another input device 522. The touchscreen 521, also referred to as a touch panel, may capture a touch operation of a user on or near the touchscreen (for example, an operation performed by the user by using any appropriate object or accessory such as a finger or a stylus on the touchscreen 521 or near the touchscreen 521), and drive a corresponding connection apparatus according to a preset program. Optionally, the touchscreen 521 may include two parts: a touch detection apparatus and a touch controller. The touch detection apparatus detects a touch direction of the user, detects a signal generated by the touch operation, and transmits the signal to the touch controller. The touch controller receives touch information from the touch detection apparatus, converts the touch information into touch point coordinates, and transmits the touch point coordinates to the processor 55, and can receive a command transmitted by the processor 55 and execute the command. In addition, the touchscreen 521 may be implemented by using multiple types such as resistive, capacitive, infrared, and surface acoustic wave. The another input device 522 may include but is not limited to one or more of a physical keyboard, a function key (such as a volume control key or a power key), a trackball, a mouse, a joystick, or the like.

The display unit 53 may be configured to display information entered by the user or information provided for the user and various menus of the smartphone. The display unit 53 may include a display panel 531. Optionally, the display panel 531 may be configured in a form of a liquid crystal display (liquid crystal display, LCD), an organic light-emitting diode (organic light-emitting diode, OLED), or the like. Further, the touchscreen 521 may cover the display panel 531. When the touchscreen 521 detects a touch operation on or near the touchscreen, the touchscreen 521 transmits the touch operation to the processor 55 to determine a type of a touch event. Afterward, the processor 55 provides a corresponding visual output on the display panel 531 according to the type of the touch event. Although the touchscreen 521 and the display panel 531 are used as two independent components to implement input and output functions of the smartphone in FIG. 12, the touchscreen 521 and the display panel 531 may be integrated to implement input and output functions of the smartphone in some embodiments.

The audio frequency unit 54 includes an audio frequency circuit 541, a speaker 542, and a microphone 543. The audio frequency unit 54 may provide an audio interface between the user and the smartphone. The audio frequency circuit 541 may transmit an electrical signal converted from received audio data to the speaker 542, and the speaker 542 converts the electrical signal into an audio signal for outputting. On the other hand, the microphone 543 converts a captured audio signal into an electrical signal, and the audio frequency circuit 541 converts the received electrical signal into audio data, and then outputs the audio data to the RF circuit 50; then the audio data is transmitted to another smartphone, or the audio data is output to the memory 51 for further processing.

The processor 55 is a control center of the smartphone. The processor 55 uses various interfaces and lines to connect all parts of the entire smartphone, and executes various functions and data processing of the smartphone by running or executing the software program and module stored in the memory 51 and invoking data stored in the memory 51, thereby implementing corresponding functions of the smartphone. Optionally, the processor 55 may include one or more processing units. Preferably, the processor 55 may integrate an application processor and a modem processor. The application processor mainly processes the operating system, a user interface, an application, and the like. The modem processor mainly processes wireless communication. It may be understood that the modem processor may also not be integrated with the processor 55.

The smartphone further includes the power supply 56 (such as a battery) supplying power to each component. Preferably, the power supply may be logically connected to the processor 55 by using a power management system, so as to implement functions such as charge and discharge management and power consumption management by using the power management system.

The interface 57 may be configured to connect to another device, and transmit data between the smartphone and the another device.

Optionally, the smartphone may further include a wireless fidelity (wireless fidelity, WiFi) module not shown in FIG. 12, a Bluetooth module, or the like. Details are not further described herein in this embodiment of the present invention.

An embodiment of the present invention further provides a computer-readable storage medium. The computer-readable storage medium stores one or more programs, the one or more programs include a computer-executable instruction, and when at least one processor of an intelligent terminal executes the computer-executable instruction, the intelligent terminal performs the method for obtaining web content as shown in FIG. 2, FIG. 4, FIG. 6, FIG. 8, or FIG. 9. For a specific method for obtaining web content, refer to the descriptions about the embodiment shown in FIG. 2, FIG. 4, FIG. 6, FIG. 8, or FIG. 9. Details are not further described herein.

In this embodiment of the present invention, after determining a web view control on a first display interface displayed on a display screen of an intelligent terminal when an application runs, an apparatus for obtaining web content on the intelligent terminal registers a web content loading complete function with an operating system of the intelligent terminal. This may ensure that, after all web content displayed by the web view control is loaded completely, the operating system may invoke the web content loading complete function to respond to the event that the web content is loaded completely. That is, if it is determined that the operating system invokes the web content loading complete function, the apparatus for obtaining web content may determine that the web content is loaded completely. Therefore, it may be ensured that obtaining apparatus starts to obtain the web content only after all the web content is loaded completely, and sends the obtained web content to the operating system. Therefore, the operating system may obtain the web content displayed on the display interface of the intelligent terminal when the application runs, and the intelligent terminal can obtain the web content displayed on the display interface when the application runs.

The foregoing descriptions about implementations allow a person skilled in the art to understand that, for the purpose of convenient and brief description, division of the foregoing functional modules is taken as an example for illustration. In actual application, the foregoing functions can be allocated to different modules and implemented according to a requirement, that is, an inner structure of an apparatus is divided into different functional modules to implement all or part of the functions described above. For a detailed working process of the foregoing system, apparatus, and unit, refer to a corresponding process in the foregoing method embodiments, and details are not further described herein.

In the several embodiments provided in this application, it should be understood that the disclosed system, apparatus, and method may be implemented in other manners. For example, the described apparatus embodiment is merely an example. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a computer device (which may be a personal computer, a server, a network device, or the like) to perform all or some of the steps of the methods described in the embodiments of the present invention. The foregoing storage medium includes: any medium that can store program code, such as a flash memory, a removable hard disk, a read-only memory, a random access memory, a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for obtaining web content, comprising:
    determining a web view control corresponding to web content to be displayed on a first display interface, wherein the first display interface comprises an interface displayed on a display screen of an electronic terminal when an application runs on the electronic terminal;
    determining that an operating system of the electronic terminal invokes a web content loading complete function, wherein the web content loading complete function is registered with the operating system of the electronic terminal, and wherein the operating system invokes the web content loading complete function after the web content to be displayed by the web view control is completely loaded; and
    obtaining the web content after the operating system invokes the web content loading complete function.

2. The method of claim 1, wherein determining the web view control corresponding to the web content displayed on the first display interface comprises:
    determining that the operating system invokes a redraw notification interface to notify obtaining apparatus that a current display interface changes when the current display interface changes, and wherein the current display interface comprises an interface currently displayed on the display screen of the electronic terminal; and
    traversing, after the operating system invokes the redraw notification interface, controls corresponding to content displayed on the first display interface after the current display interface change, thereby determining the web view control corresponding to the web content displayed on the first display interface.

3. The method of claim 1, wherein the web content loading complete function is registered with the operating system using a web registration and callback interface of the operating system, and wherein determining that the operating system invokes the web content loading complete function comprises determining, using the web registration and callback interface of the operating system, that the operating system invokes the web content loading complete function.

4. The method of claim 1, wherein the web view control comprises a pre-set script, and wherein obtaining the web content comprises executing the pre-set script to obtain the web content.

5. The method of claim 1, wherein collecting data generated by content loaded on the interface further comprises obtaining user information, and obtaining the web content according to analysis of the user information supplemented by external data.

6. The method of claim 5, wherein the external data comprises consumer comments selected based on user information.

7. The method of claim 5, wherein the external data comprises a combination of location and local time.

8. The method of claim 5, further comprising:
    after performing analytical processing on the collected data, performing unified analysis of data comprising:
    the user history database;
    a terminal location;
    user information; and
    an output of an intelligent sensor component of the terminal; and then
    displaying content according to the unified data analysis.

9. The method of claim 5, wherein the user content comprises a user music preference.

10. The method of claim 5, wherein the user content comprises a user video preference.

11. The method of claim 5, wherein the user content comprises a user eating preference.

12. The method of claim 5, wherein the user content comprises a user shopping preference.

13. An electronic terminal, comprising:
    a processor configured to determine a web view control corresponding to web content to be displayed on a first display interface; and a display screen coupled to the processor and configured to display the first display interface, wherein the first display interface comprises an interface of an application run on the electronic terminal, and wherein the processor is further configured to:
determine that an operating system of the electronic terminal invokes a web content loading complete function, wherein the web content loading complete function is registered with the operating system of the electronic terminal, and wherein the operating system invokes the web content loading complete function after the web content to be displayed by the web view control is completely loaded; and obtain the web content after the operating system invokes the web content loading complete function.

14. The electronic terminal of claim 13, wherein when determining the web view control corresponding to the web content displayed on the first display interface, the processor is further configured to:
determine that the operating system invokes a redraw notification interface to notify obtaining apparatus when a current display interface changes, wherein the current display interface comprises an interface currently displayed on the display screen of the electronic terminal; and
traverse, after the operating system invokes the redraw notification interface, controls corresponding to content displayed on the first display interface after the current display interface change and determine the web view control corresponding to the web content displayed on the first display interface.

15. The electronic terminal of claim 13, wherein the web content loading complete function is registered with the operating system using a web registration and callback interface of the operating system, and when determining that the operating system invokes the web content loading complete function, the processor is further configured to determine, using the web registration and callback interface of the operating system, that the operating system invokes the web content loading complete function.

16. The electronic terminal of claim 13, wherein the web view control comprises a pre-set script, and when obtaining the web content, the processor is further configured to execute the pre-set script to obtain the web content.

17. A non-transitory computer-readable storage medium comprising instructions which, when executed by an electronic terminal, cause the electronic terminal to:
determine a web view control corresponding to web content to be displayed on a first display interface, wherein the first display interface comprises an interface displayed on a display screen of the electronic terminal when an application runs on the electronic terminal;
determine that an operating system of the electronic terminal invokes a web content loading complete function, wherein the web content loading complete function is registered with the operating system of the electronic terminal, and wherein the operating system invokes the web content loading complete function after the web content to be displayed by the web view control is completely loaded; and
obtain the web content after the operating system invokes the web content loading complete function.

18. The non-transitory computer-readable storage medium of claim 17, wherein when determining the web view control corresponding to the web content displayed on the first display interface, the instructions further cause the electronic terminal to:
determine that the operating system invokes a redraw notification interface to notify obtaining apparatus that a current display interface changes, wherein the current display interface comprises an interface currently displayed on the display screen of the electronic terminal; and
traverse, after the operating system invokes the redraw notification interface, controls corresponding to content displayed on the first display interface after the current display interface change the web view control corresponding to the web content displayed on the first display interface.

19. The non-transitory computer-readable storage medium of claim 17, wherein the web content loading complete function is registered with the operating system using a web registration and callback interface of the operating system, and when determining that the operating system invokes the web content loading complete function, the instructions further cause the electronic terminal to determine, using the web registration and callback interface of the operating system, that the operating system invokes the web content loading complete function.

20. The non-transitory computer-readable storage medium of claim 17, wherein the web view control comprises a pre-set script, and when obtaining the web content, the instructions further cause the electronic terminal to execute the pre-set script to obtain the web content.

* * * * *